United States Patent [19]

Mizutani

[11] Patent Number: 4,878,981

[45] Date of Patent: Nov. 7, 1989

[54] FORM COLLATOR GLUING APPARATUS

[75] Inventor: Mario Mizutani, Yokohama, Japan

[73] Assignee: Print Kiko Co., Ltd., Tokyo, Japan

[21] Appl. No.: 195,018

[22] Filed: May 17, 1988

[30] Foreign Application Priority Data

May 22, 1987 [JP] Japan ................................ 62-125351

[51] Int. Cl.[4] ................................................ B29C 19/00

[52] U.S. Cl. ..................................... 156/356; 118/241; 118/323; 118/681; 156/578; 270/53

[58] Field of Search ................ 156/578, 356; 118/241, 118/256, 680, 681, 211, 223, 323; 270/53

[56] References Cited

U.S. PATENT DOCUMENTS

| | | | |
|---|---|---|---|
| 2,347,445 | 4/1944 | Von Hofe | 118/211 |
| 3,303,083 | 2/1967 | Hedenström | 270/53 X |
| 3,425,393 | 2/1969 | Shuh | 118/241 X |
| 3,832,213 | 8/1974 | Brenner | 118/681 X |
| 4,280,864 | 7/1981 | Blomberg | 156/578 X |
| 4,426,072 | 1/1984 | Cole et al. | 270/53 |

*Primary Examiner*—David Simmons

*Attorney, Agent, or Firm*—Fleit, Jacobson, Cohn, Price, Holman & Stern

[57] ABSTRACT

A form collator gluing apparatus in which a plurality of rollers each having a pin wheel are arranged in a framework, a sheet of paper guided by a guide roller is hung over the roller and transferred by a main motor, the sheet of paper is opposite a nozzle mounted on an outlet side of a gear pump which is communicated with a glue tub through a hose, and glue discharged from the gear pump is skippingly or linearly applied onto the continuous sheet of paper by a motor drive and an electronic control of a computer, or by swinging the gear pump by a mechanical means such as cam.

2 Claims, 3 Drawing Sheets

FORM COLLATOR GLUING APPARATUS

BACKGROUND OF THE INVENTION

This invention relates to a gluing apparatus for performing a gluing of a form collator, etc. by a motor drive and an electronic control of a computer or mechanical means of a cam, etc.

Heretofore, there has been used in general a gluing apparatus in which a continuous slip is hung over a plurality of pin wheels arranged in a framework, the pin wheels are driven by a motor to transfer the continuous slip, and in the meantime, a rotary plate dipped in a glue tub is turned in order to spoon glue therein and contacted with the transferring continuous slip for applying the glue thereon. There has been also used another gluing apparatus, in which a gear pump is provided, glue in a glue tub is transferred to a nozzle mounted on a hose and located opposite each slip at a remote place through the gear pump.

However, in the conventional gluing apparatus, it is almost impossible to perform a skip gluing or a spot gluing when the rotary plate is used. If not impossible, it becomes mechanically complicated. Further, since glue is easily hardened when it contacts air, the rotary plate is coated with glue hardened thereon and, when the gluing work is continued for a long time, the gluing portion spreads. Therefore, it is required to remove this hardened glue portion and thus is inconvenient. Furthermore, since the upper portion of the glue tub is opened, the glue contained in the tub is easily mixed with dust, etc. and, therefore, must be replaced with fresh glue each time the gluing work is finished. This is naturally a waste of glue.

In the conventional apparatus with a nozzle mounted on the foremost end of the hose, the gear pump is disposed on the vicinity of the glue tub located at a remote place and the glue is fed to the nozzle from the gear pump through the hose. Therefore, even after the gear pump is stopped, the glue often remains in the hose, and the glue remaining in the hose often comes out owing to inner pressure inside the hose and makes the slip dirty.

The present invention has been accomplished in order to eliminates the above-mentioned inconvenience.

SUMMARY OF THE INVENTION

It is therefore a first object of the present invention to provide a form collator gluing apparatus which is simple in structure, and in which the working efficiency is improved, the glue can be always applied uniformly, and a linear gluing, dot gluing or a skip gluing can be selectively made, thereby to improve the quality of a product and to enhance the gluing work. In order to achieve the first object, there is essentially provided a form collator gluing apparatus in which the collator comprises a framework, a plurality of rollers each having a pin wheel and mounted in the framework, and a guide roller for guiding a continuous sheet of paper hung over the pin wheels and rollers, the continuous sheet of paper being collated while being transferred by the rollers driven by a main motor. The gluing apparatus comprises a gear pump, an intake side of which is communicated with a glue tub through a hose and an outlet side of which is provided with a nozzle opposite the continuous sheet of paper. The gear pump is controlled by an encoder for detecting the continuous sheet of paper and is driven a motor which is connected to a computer with a program stored therein.

A second object of the present invention is to provide a form collator gluing apparatus, in which the gluing work is mechanically performed and the glue, when the apparatus is stopped, is prevented from coming out of the hose so as not to dirty the slip, so as to avoid the loss of the adhesive liquid, and so as to apply the adhesive liquid according to demand.

BRIEF DESCRIPTION OF THE DRAWINGS

The drawings illustrate the embodiments of a form collator gluing apparatus according to the present invention, in which.

DETAILED DESCRIPTION OF THE EMBODIMENTS

The embodiments of a form collator gluing apparatus according to the present invention will be concretely described hereunder with reference to the accompanying drawings.

Figure 1:
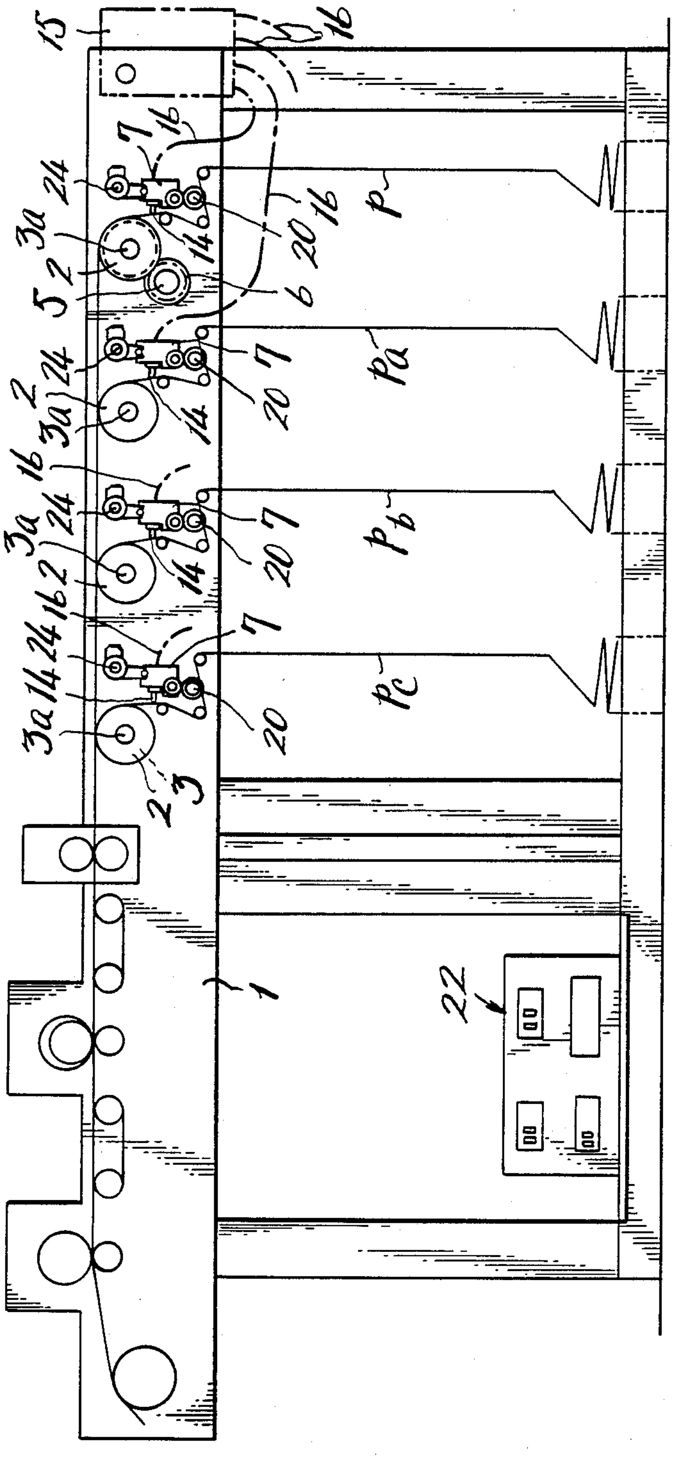
FIG. 1 is a vertical sectional view of a collator.
Figure 3:
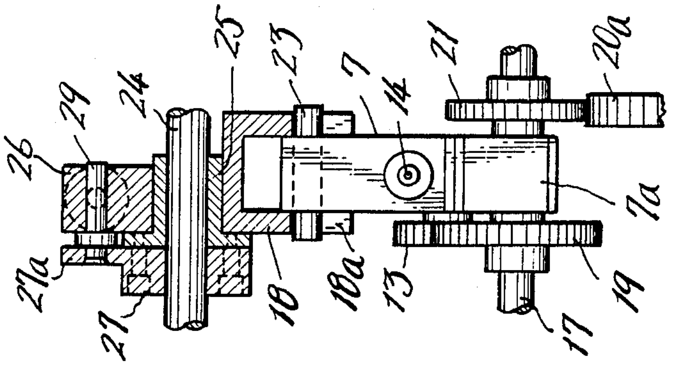
FIG. 3 is a sectional view taken along line III-III of FIG. 2.
Figure 2:
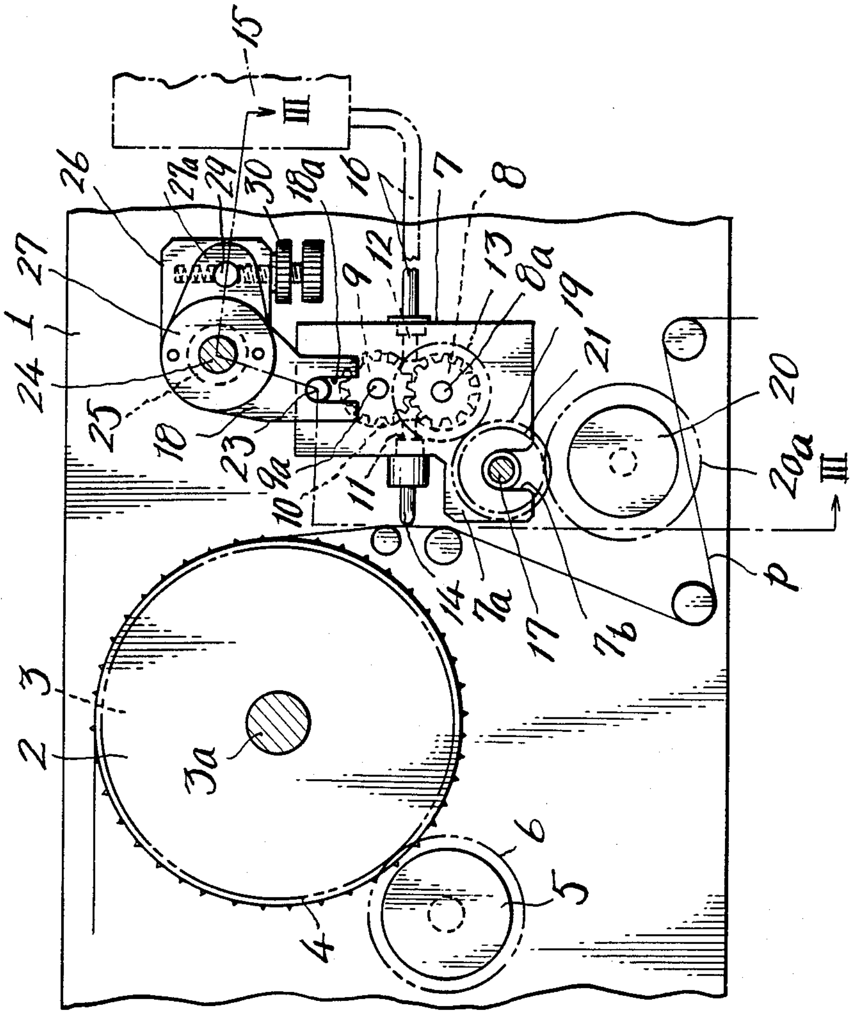
FIG. 2 is a partly enlarged view of FIG. 1.

In FIGS. 1 through 3, 1 denotes a framework. The framework 1 is provided with a plurality of rollers 3 spacedly arranged and each having a pin wheel 2. Roller shafts 3*a* are rotated by a main motor. One of the roller shafts 3*a* is provided with a gear 4. The gear 4 is meshed with a gear 6 of an encoder 5. A sheet of continuous paper having pin holes and perforations arranged in the transverse direction at predetermined pitches and meshing with the pins of the wheel 2 is hung over each pin wheel 2 and roller 3 and transferred for detection.

A gear pump body 7 is located opposite each of the continuous sheets of papers P, Pa, Pb and Pc. The gear pump body 7 is formed with a continuous chamber 10 therein containing a pair of meshed gears 8 and 9 acting as a rotor. The continuous portion of the chamber 10 is provided with an outlet port 11 and an inlet port 12.

The meshed gears 8 and 9 are rotatably supported by shafts 8*a* and 9*a* within the chamber 10 for pumping. The shaft 8*a* is provided at the outer side of the body 7 with a gear 13 for driving.

The body 7 is provided with a nozzle 14 communicating with the outlet port 11, and the inlet port 12 is connected with a hose 16 from a glue tub 15 as will be described afterward.

The main body 7 is provided at its lower portion with an expanding portion 7*a* expanding in the direction of the nozzle 14. The expanding portion 7*a* is provided at its lower surface with a cut-away groove 7*b* for engaging with a rotary shaft 17 disposed in the transverse direction on the framework 1. The body 7 is supported by an operating arm 18 as will be described afterward. The rotary shaft 17 is provided with a gear 19 for meshing with the gear 13 on the body 7, and a gear 21 for meshing with a gear 20*a* on a servo motor 20 as will be described below. The encoder 5 detects the movement amount of the continuous sheet of paper as a desired pulse amount and the detected pulse amount is counted by a program counter located within a computer 22 thereby to activate the servo motor 20 at a predetermined position of the paper sheet. By this means, a skip gluing and a spot gluing can be effected.

The servo motor 20 carries out the gluing by driving the gear pump body 7. In order to effect the skip gluing or the spot gluing, the servo motor 20 is stopped working for a predetermined interval so as not to apply the glue onto the continuous sheet of paper. However, since the foregoing arrangement is insufficient for completely stopping the discharging of the glue under excess pressure within the gear pump, a reverse rotation is given to the servo motor 20. The program stored in the computer 22 is prepared as such that, after the reverse rotation, a desired amount of normal rotation is effected in order to facilitate the discharge of glue.

The computer 22 memorizes the establishment of cross machine size of the continuous sheet of paper, the positioning of the start of the gluing work, the establishment of the distance between the adjacent spot glues, etc. and contains the afore-mentioned program.

The operating arm 18 is provided with a cut-away groove 18a for holding a pin 23 provided on an upper portion of the body 7 and the upper portion of the body 7 is supported by the pin 23. The operating arm 18 is expanded from an operating member 26 loosely fitted to a shaft 24 carried on the framework 1 through a bush 25.

The operation member 26 is formed therein with a vertical hole and with a pin hole perpendicular to the vertical hole and passing across the vertical hole. A pin 29 provided on the arm 27a from an mounting member 27 mounted on a shaft 24 is inserted in the pin hole, and a spring mounted in the vertical hole and an adjusting screw 30 screwed there into from the end portion of the vertical hole render a damping effect.

The operation of the present invention will now be described. First, in order to automatically skip the cross machine, the information of the size of the cross machine perforation and skipping are established in the program and memorized, the program is set in accordance thereto, the start position is adjusted, and then the switch is turned on. As a result, the main motor is driven and the motor's rotation is transmitted to the pin wheel 2 and roller 3 to transfer the continuous sheet of paper. On the other hand, the encoder 5 is actuated by the gear 6 meshed with the gear 4 formed on the roller 3, the gear pump is rotated by the servo motor 20 driven by this signal and a pulse signal by a counter signal input in the program, and the glue discharged from the nozzle 14 mounted on the body 7 is applied onto the continuous sheet of paper. When the nozzle separation pulse is actuated by the pulse signal of the encoder 5 and the pulse signal of the program counter, the servo motor 20 is rotated reversely for the amount of skip establishment dimension, and the servo motor 20 is rotated normally immediately before it passes the skip establishment dimension to discharge the glue from the nozzle 14. That is, a normal rotation and an instant reverse rotation are effected by the pulse signal of the encoder 5 and the pulse signal coming from the program counter in order to skip the cross machine by the amount of the established length.

Next, in order to perform a spot gluing, the distance between the adjacent spot gluing is memorized in the computer and the motor is rotated normally and reversely in turn by the pulse signal of the encoder and the signal of the program counter according to the program with data input therein, so as to spottedly apply the glue onto the continuous sheet of paper.

Figure 4:
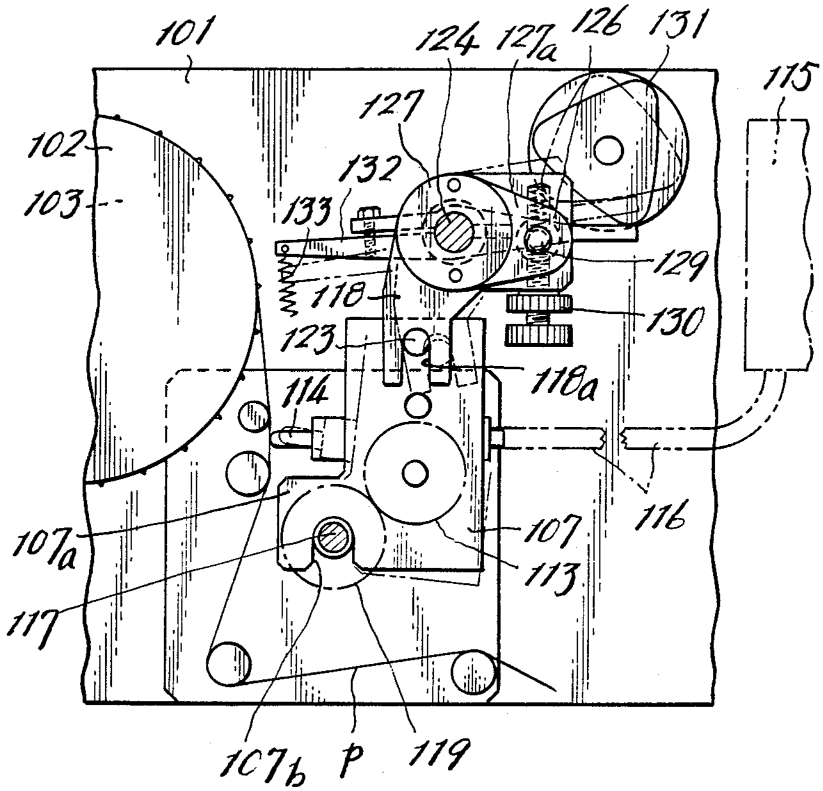
FIG. 4 is an enlarged view of part of another embodiment.

FIG. 4 illustrates another embodiment of the collator, in which the body of a gear pump is mechanically swung and a nozzle mounted on the outlet port side of the body is separated from the continuous sheet of paper when the skip gluing is performed. A roller 103 having a pin wheel 102 is mounted in a framework 101. The pin wheel 102 and the roller 103 are driven by a main motor in order to continuously transfer continuous sheets of paper P, Pa . . . hung over the pin wheel 102 and the roller 103.

A gear pump body 107 is located opposite each continuous sheet of paper P, Pa ... The gear pump body 107 contains therein gears meshed with each other and acting as a rotor. The body 107 is formed therein with a chamber. One end of a hose 116 connected with a glue tub is connected with the chamber. The body 107 is formed at its lower portion with an expanding portion 107a expanding in the direction of the nozzle provided on the body 107. The lower surface of the expanding portion 107a is formed with a cut-away groove 107b for engaging with a rotary shaft 117 extending across the framework 101. The body 107 is supported on the rotary shaft 117 and an operating arm 118 as will be described below.

The rotary shaft 117 is provided with a gear 119 for meshing with a gear 113 mounted on a rotor shaft disposed within the body 107, so that the rotation of the rotary shaft 117 is transmitted to the gear within the body 107. That is, a pumping effect is produced.

The body 107 is provided at its upper portion with a pin 123 in the transverse direction. Further, on this upper portion, an operating arm 118 extending from an operating member 126 is loosely fitted to a shaft 124 extending across and carried by the frame work 101 through a bush, and the pin 123 is fitted into the cut-away groove 118a formed in the clamping portion of the operating arm 118, thereby to support the body 107.

The operating member 126 is formed therein with a vertical hole. The operating member 126 is also formed therein with a pin hole in the direction across the vertical hole. An arm 127a from a mounting member 127 mounted on the shaft 124 is provided at its foremost end with a pin 129, and the pin 129 is inserted into the pin hole. A spring mounted in the vertical hole and an adjusting screw 130 screwed therein from its end portion render a damping effect.

The shaft 124 is provided with an operating piece 132 mounted on its one end and actuated by a cam plate 131 for swinging the body 107. The operating piece 132 is provided with a tension spring 133 so that it is abutted against the cam plate 131. As a result, the shaft 124 is rotated by the cam plate 131 through the operating piece 132.

According, the glue within the glue tub 115 is intaken into the body 107 due to the pumping effect through the hose 116, and the intaken glue is discharged from the nozzle 114 and linearly applied onto the continuous sheet of paper P, Pa . . . The continuous sheets of paper coated with the glue are collated.

In order to spottedly apply the glue with a space between the adjacent glue coatings, the shaft is swung by the cam plate 131 for actuating one end of the operating piece 132 mounted on one end of the shaft 124 through the operating piece 132. As a result, the operating member 126 is swung through the arm 127a from the mounting member 127 mounted on the shaft 124, and the body 107 is swung about the rotary shaft 117 by the operating arm 118 thereby to approach or separate the nozzle 114 mounted on the body 107 to and from the continuous sheet of paper, so that the glue can be coated thereon with a space between the adjacent glue coatings.

With regard to the space, various spaced can be made by the cam plate 131.

As described in the foregoing, according to a gluing apparatus of the present invention, by a servo motor driven by a program counter signal input with size and data memorized in a computer and an encoder signal, a gear pump body provided with a nozzle for applying glue onto a continuous sheet of paper hung over a roller having a pin wheel and thereover is located opposite the continuous sheet of paper, glue is discharged from the nozzle and momentarily intaken positively according to the data input in the program for driving the body, and as a result, a skip gluing or a spot gluing is effected according to the size of a cross machine. Therefore, the size adjustment, the discharge of glue and the stopping of the discharge can be effected simply by means of the operation of one button.

Further, the speed can be enhanced and work efficiency can be improved. Moreover, the continuous sheet of paper can be prevented from getting dirty with glue and glue can be saved.

In addition, when the gluing apparatus is mechanically actuated, the replacement of a cam as means for swinging the body permits a free selection of the skipping distance.

What is claimed is:

1. A form collator gluing apparatus comprising:

a framework;

a plurality of rollers arranged in said framework, said rollers each having a pinwheel and being driven by a main motor whereby a separate continuous sheet of paper may be hung over each of said rollers and the pinwheel thereof for transfer thereover through said framework;

a gear pump mounted adjacent each of said rollers, each said gear pump having a glue outlet provided with a nozzle in opposing relation to a respective continuous sheet of paper passing over the adjacent roller, an inlet of said gear pump being communicated via a hose with a glue tube, each said gear pump being swingably mounted on said framework for permitting the nozzle of said gear pump to be selectively brought into and out of contact with said respective continuous sheet of paper; and a cam mounted on said framework for swinging said gear pump with respect to said sheet of paper;

whereby glue discharged from said nozzle can be continuously applied to the respective continuous sheet of paper by maintaining the nozzle in contact with the sheet of paper, and whereby, by said cam swinging said gear pump to bring the nozzle thereof alternately into and out of contact with the sheet of paper, glue discharged from said nozzle can be skippingly applied to the sheet of paper.

2. A glue collator gluing apparatus according to claim 1, further comprising an encoder associated with said gear pump for detecting the movement amount of a sheet of paper past the nozzle of the gear pump, and wherein the gear pump is driven by a servo motor controlled by a computer connected to said encoder and containing a program, whereby, with the gear pump nozzle in contact with the sheet of paper, the gear pump is driven normally by the servo motor for applying glue to the sheet of paper and the gear pump is intermittently driven in reverse by the servo motor to skippingly apply glue to the sheet of paper.

* * * * *